United States Patent
Bajpai et al.

(10) Patent No.: US 12,066,970 B1
(45) Date of Patent: Aug. 20, 2024

(54) SYSTEMS AND METHODS FOR ESTABLISHING SESSIONS BETWEEN CPUS USING A MULTIPLEXER

(71) Applicant: Cisco Technology, Inc., San Jose, CA (US)

(72) Inventors: Mridul Bajpai, Brentwood, CA (US); Hsi-Wen Chen, Fremont, CA (US); Mete Yilmaz, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 394 days.

(21) Appl. No.: 16/809,317

(22) Filed: Mar. 4, 2020

Related U.S. Application Data

(60) Provisional application No. 62/946,233, filed on Dec. 10, 2019.

(51) Int. Cl.
  *G06F 13/42* (2006.01)
  *G06F 1/18* (2006.01)
  *G06F 13/38* (2006.01)
  *G06F 13/40* (2006.01)

(52) U.S. Cl.
  CPC .......... *G06F 13/4226* (2013.01); *G06F 1/183* (2013.01); *G06F 13/385* (2013.01); *G06F 13/4081* (2013.01)

(58) Field of Classification Search
  None
  See application file for complete search history.

(56) References Cited

U.S. PATENT DOCUMENTS

| | | | |
|---|---|---|---|
| 6,549,967 B1 * | 4/2003 | McTague | G06F 13/423 710/302 |
| 6,647,508 B2 | 11/2003 | Zalewski et al. | |
| 6,856,600 B1 | 2/2005 | Russell et al. | |
| 6,973,044 B1 * | 12/2005 | Barach | H04L 43/02 370/252 |
| 7,441,066 B2 | 10/2008 | Bouchier et al. | |
| 8,601,053 B2 | 12/2013 | Mehrotra et al. | |
| 8,621,275 B1 * | 12/2013 | Havemose | G06F 11/2097 714/13 |
| 9,747,183 B2 | 8/2017 | Bhattacharya et al. | |
| 10,069,688 B2 | 9/2018 | Atyam et al. | |
| 10,133,619 B1 | 11/2018 | Nagpal et al. | |
| 10,511,546 B2 | 12/2019 | Singarayan et al. | |
| 2001/0056553 A1 * | 12/2001 | Suzuki | H04L 41/0681 714/4.1 |
| 2008/0077722 A1 * | 3/2008 | Tang | G06F 13/385 710/49 |

(Continued)

FOREIGN PATENT DOCUMENTS

CN  106445855 B  2/2019

*Primary Examiner* — Farley Abad
*Assistant Examiner* — Dayton Lewis-Taylor
(74) *Attorney, Agent, or Firm* — Baker Botts L.L.P.

(57) ABSTRACT

In one embodiment, a method includes connecting, via a first interface of a controller card, a multiplexer of the controller card to a central processing unit (CPU) of the controller card. The method also includes connecting, via an interface of a first remote card, the multiplexer of the controller card to the first remote card. The method further includes interconnecting, by the multiplexer, the first interface of the controller card to the interface of the first remote card.

20 Claims, 3 Drawing Sheets

(56) References Cited

U.S. PATENT DOCUMENTS

| | | | |
|---|---|---|---|
| 2011/0090782 A1* | 4/2011 | Bianchi | H04B 3/32 370/201 |
| 2018/0097908 A1* | 4/2018 | Ayyagari | H04L 67/2852 |
| 2019/0327126 A1 | 10/2019 | Rivaud et al. | |

* cited by examiner

SYSTEMS AND METHODS FOR ESTABLISHING SESSIONS BETWEEN CPUS USING A MULTIPLEXER

CROSS-REFERENCE TO RELATED APPLICATIONS

This application claims benefit of U.S. Provisional Application No. 62/946,233 filed Dec. 10, 2019, by Mridul Bajpai et al., and entitled "Reliable Multiple Simultaneous Remote Console Connections in a Distributed System," which is incorporated herein by reference.

TECHNICAL FIELD

This disclosure generally relates to establishing sessions between central processing units (CPUs), and more specifically to systems and methods for establishing sessions between CPUs using a multiplexer.

BACKGROUND

In a distributed chassis-based routing system, debugging problems that occur on various remote cards in the system is challenging. Often, a physical console is not available to the different remote cards, and users rely on Secure Shell (SSH) or Telnet connections to debug the issues. However, these network protocols may be unreliable for debugging problems that occur in early boot up or while the remote card is in Basic Input/Output System (BIOS).

DESCRIPTION OF EXAMPLE EMBODIMENTS

Overview

Figure 1:
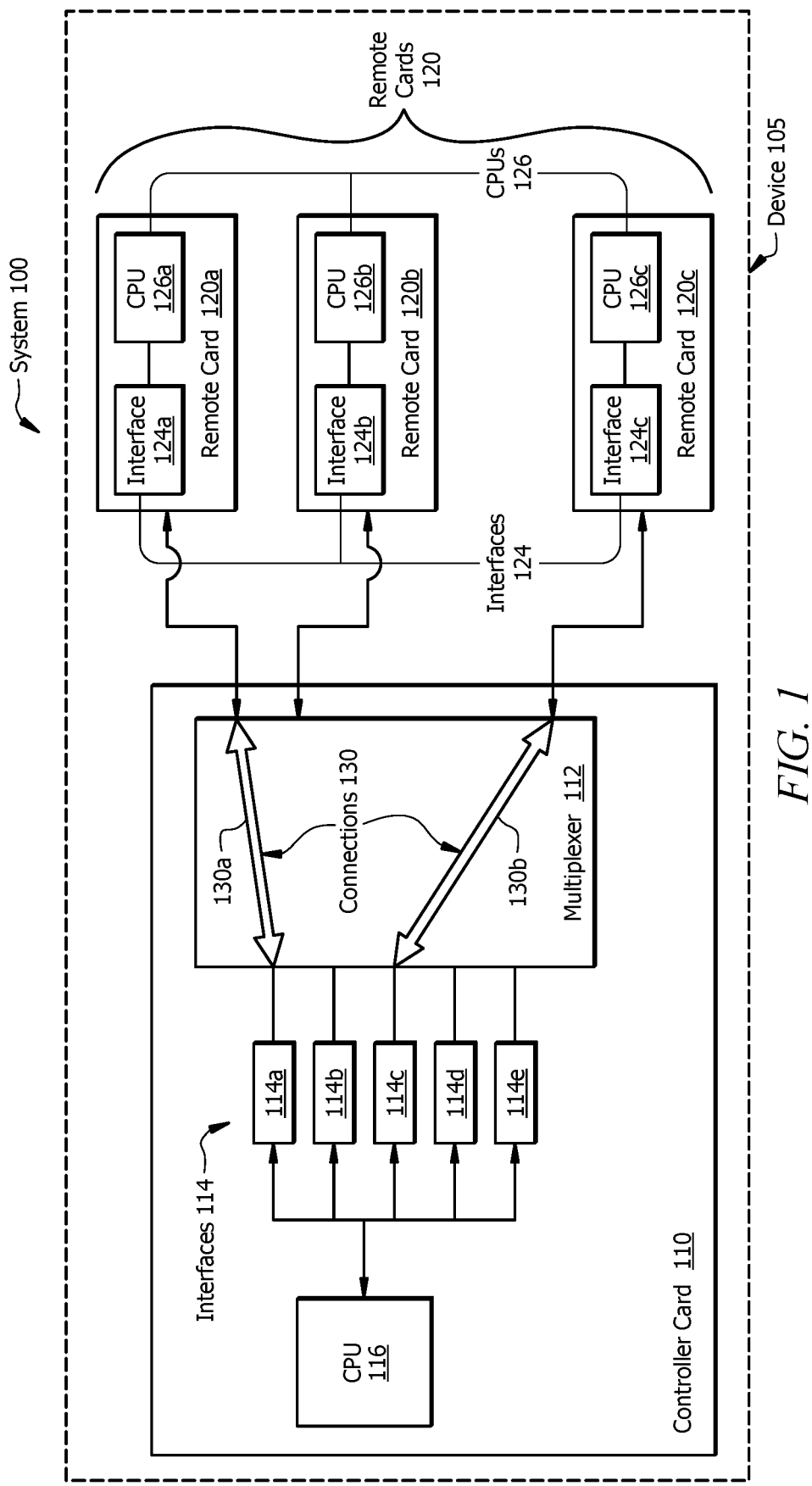
FIG. 1 illustrates an example system for establishing sessions between CPUs using a multiplexer.

According to an embodiment, a multiplexer includes one or more processors and one or more computer-readable non-transitory storage media coupled to the one or more processors. The one or more computer-readable non-transitory storage media include instructions that, when executed by the one or more processors, cause the multiplexer to perform operations including connecting, via a first interface of a controller card, the multiplexer of the controller card to a central processing unit (CPU) of the controller card. The operations also include connecting, via an interface of a first remote card, the multiplexer of the controller card to the first remote card. The operations further include interconnecting the first interface of the controller card to the interface of the first remote card.

In certain embodiments, the operations include connecting, via a second interface of the controller card, the multiplexer of the controller card to the CPU of the controller card, connecting, via an interface of a second remote card, the multiplexer of the controller card to the second remote card, and interconnecting the second interface of the controller card to the interface of the second remote card. In some embodiments, the first interface of the controller card is interconnected to the interface of the first remote card while the second interface of the controller card is interconnected to the interface of the second remote card.

In certain embodiments, the CPU of the first remote card is monitored for faults while the session between the CPU of the controller card and the CPU of the first remote card is established and prior to completing boot up of the CPU of the remote card. In some embodiments, the first interface of the controller card and the interface of the first remote card are universal asynchronous receiver-transmitters (UARTs). In certain embodiments, the multiplexer of the controller card is connected to the first remote card over a chassis backplane. In some embodiments, the controller card is part of a router.

According to another embodiment, a method includes connecting, via a first interface of a controller card, a multiplexer of the controller card to a central processing unit (CPU) of the controller card. The method also includes connecting, via an interface of a first remote card, the multiplexer of the controller card to the first remote card. The method further includes interconnecting, by the multiplexer, the first interface of the controller card to the interface of the first remote card.

According to yet another embodiment, one or more computer-readable non-transitory storage media embody instructions that, when executed by a processor, cause the processor to perform operations including connecting, via a first interface of a controller card, a multiplexer of the controller card to a central processing unit (CPU) of the controller card. The operations also include connecting, via an interface of a first remote card, the multiplexer of the controller card to the first remote card. The operations further include interconnecting, by the multiplexer, the first interface of the controller card to the interface of the first remote card.

Technical advantages of certain embodiments of this disclosure may include one or more of the following. In some embodiments, a multiplexer of a controller card provides direct connections to remote cards without the processing/packaging of data. The remote card console is visible when the remote node is in early stages of boot up and when Ethernet or other connectivity to the remote node is not functional. As such, embodiments of this disclosure provide reliable methods for monitoring modular routing systems, including detecting faults (e.g., errors, bugs, etc.) in the systems. Certain embodiments of this disclosure provide methods for monitoring multiple remote cards in parallel, which may be used to detect/debug complex system issues. In certain embodiments, remote cards are managed independently of each other (e.g., by third party network operating systems) and run different software versions. This disclosure provides for remote access to the remote cards independent of the software/firmware running in the remote cards, which allows for independent management, fault detection, and the like in parallel.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for establishing sessions between CPUs using a multiplexer. Early boot problems in chassis-based systems are generally difficult to debug when a user wants to identify issues on cards that do not have a physical console. Features like remote console, which enable access to the console of a remote card from the controller card, have been incredibly powerful tools to debug such issues. This disclosure allows the user to reliably access and debug remote consoles of multiple remote cards in parallel.

Serial over LAN (SOL) and Console over Ethernet are mechanisms that package UART data over Ethernet and present an emulation of a remote console. However, these mechanisms are prone to network packet loss and network congestion and therefore do not work when Ethernet connectivity is not working. Certain modular router systems have one or more controller cards and several line cards and fabric cards in the chassis. The line cards/fabric cards are connected to controller cards over the chassis backplane. The CPU UARTs of the remote cards may be connected to the controller card via the backplane. Certain embodiments of this disclosure include a multi-port hardware multiplexer that allows multiple UART links to be connected to it. Each physical UART of the CPU of the controller card can be connected to the multiplexer of the controller card and then interconnected to a UART connection of a remote card. As such, simultaneous console sessions to different remote cards in the system can be launched.

Figure 2:
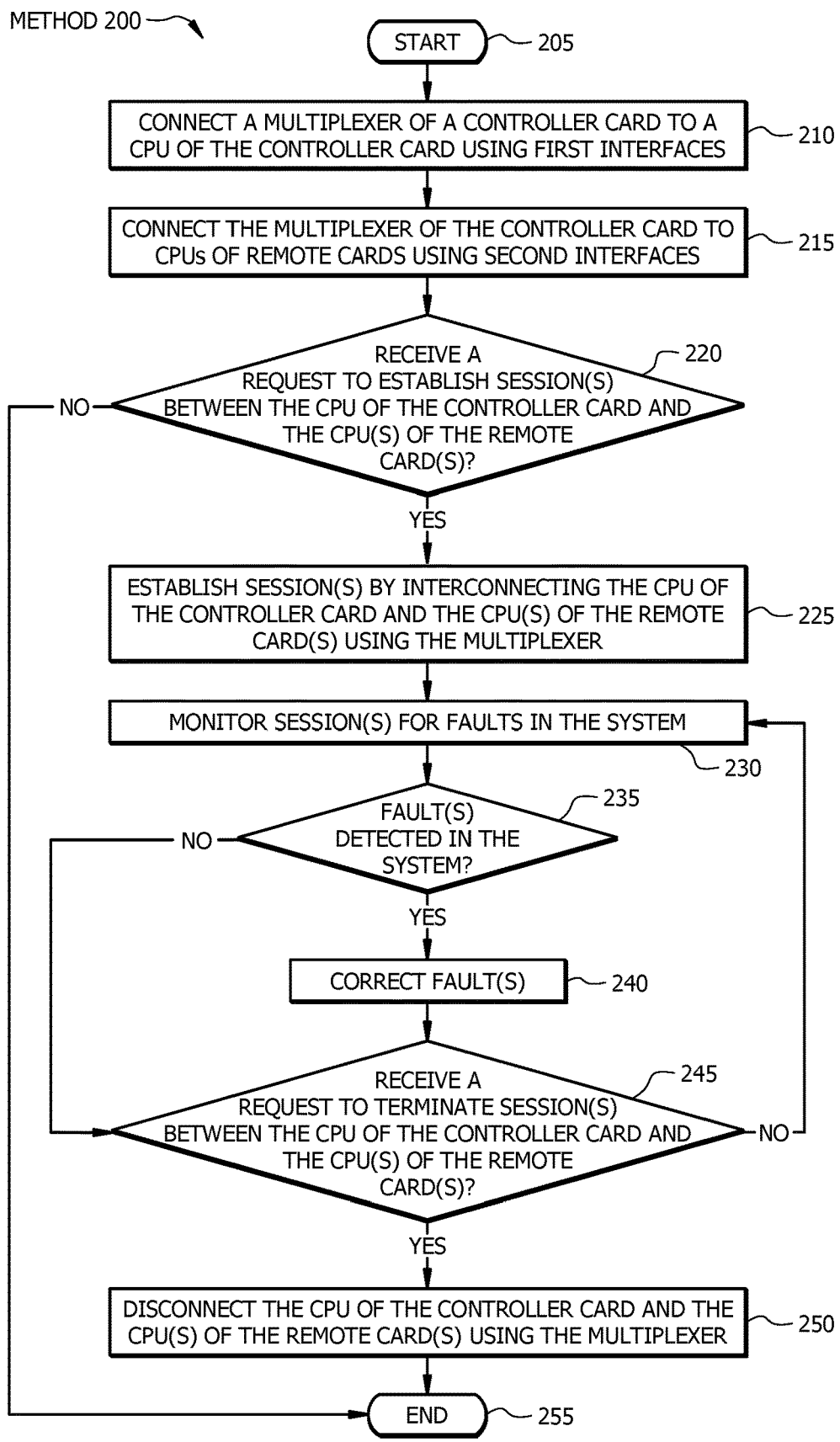
FIG. 2 illustrates an example method for establishing sessions between CPUs using a multiplexer.
Figure 3:
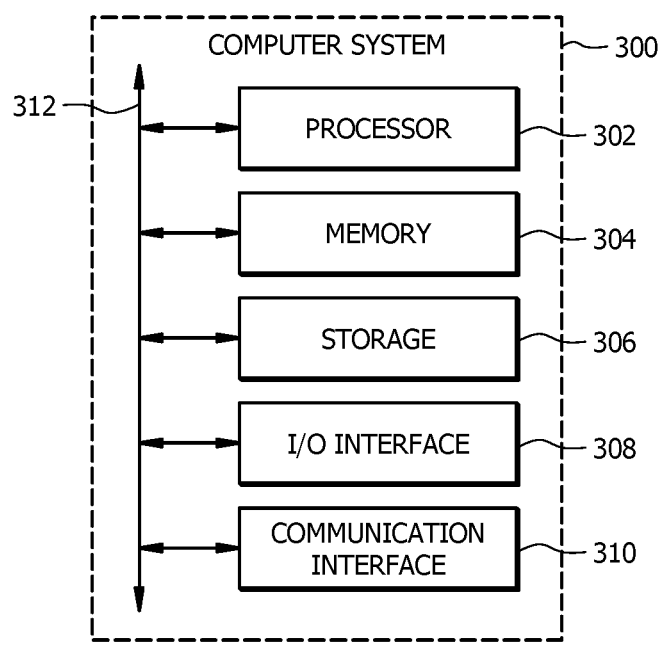
FIG. 3 illustrates an example computer system that may be used by the systems and methods described herein.

Certain embodiments of this disclosure describe systems and methods for establishing sessions between CPUs using a multiplexer. FIG. 1 shows an example system for establishing sessions between CPUs using a multiplexer, and FIG. 2 shows an example method for establishing sessions between CPUs using a multiplexer. FIG. 3 shows an example computer system that may be used by the systems and methods described herein.

FIG. 1 illustrates an example system 100 for establishing sessions between CPUs using a multiplexer. System 100 or portions thereof may be associated with an entity, which may include any entity, such as a business or company, that establishes sessions between CPUs using a multiplexer. System 100 may be a modular router system, a modular server system, or any other suitable system. The components of system 100 may include any suitable combination of hardware, firmware, and software. For example, the components of system 100 may use one or more elements of the computer system of FIG. 3. System 100 includes a device 105, a controller card 110, a multiplexer 112, interfaces 114, a CPU 116, remote cards 120, interfaces 124, and CPUs 126.

Device 105 of system 100 is physical hardware or equipment that provides one or more computing functions within system 100. Device 105 may be a router, a server, a gateway, a modem, a wireless access point, a switch, a hub, or any other suitable device 105. In certain embodiments, device 105 of system 100 includes a modular chassis. The chassis is a frame (e.g., a metal frame) that serves as the structural support for electronic components. In certain embodiments, the chassis of device 105 houses circuit boards and wiring and contains ports (e.g., slots) for remote cards 120. In the illustrated embodiment of FIG. 1, device 105 includes controller card 110.

Controller card 110 of system 100 is a hardware component that serves as an interface between a motherboard and other computer components. Controller card 110 may be installed in device 105. For example, controller card 110 may be installed in a Peripheral Component Interconnect (PCI) slot of the device. In certain embodiments, controller card 110 is integrated with the motherboard. Controller card 110 includes multiplexer 112, interfaces 114, and CPU 116.

Multiplexer 112 of system 100 is any hardware component that establishes connections 130 between CPU 116 of controller card 110 and CPUs 126 of remote cards 120. Connections 130 allow CPU 116 of controller card 110 to communicate with CPUs 126 of remote cards 120. Multiplexer 112 may receive one or more commands to establish connections 130 between CPU 116 of controller card 110 and CPUs 126 of remote cards 120. For example, an operator may input a command into device 105 that instructs multiplexer 112 to establish connection 130a between interface 114a of controller card 110 and interface 124a of remote card 120a. As another example, an operator may input a command into device 105 that instructs multiplexer 112 to establish connection 130b between interface 114c of controller card 110 and interface 124c of remote card 120c.

Connections 130 create established sessions between CPU 116 of controller card 110 and CPUs 126 of remote cards 120. In certain embodiments, CPU 116 of controller card 110 uses the established sessions created by connections 130 to monitor remote cards 120 for faults (e.g., bugs, errors, mistakes, defects, etc.). In some embodiments, CPU 116 of controller card 110 may correct the faults detected in remote card 120 while the session between CPU 116 of controller card 110 and CPU 126 of remote card 120 is established.

In certain embodiments, multiplexer 112 may receive one or more commands to terminate connections 130 between CPU 116 of controller card 110 and CPUs 126 of remote cards 120. For example, an operator may input a command into device 105 that instructs multiplexer 112 to terminate connection 130a between interface 114a of controller card 110 and interface 124a of remote card 120a. As another example, an operator may input a command into device 105 that instructs multiplexer 112 to terminate connection 130b between interface 114c of controller card 110 and interface 124c of remote card 120c. In some embodiments, one or more connections 130 may terminate after a pre-determined amount of time (e.g., ten minutes, an hour, etc.) or after an event has taken place (e.g., the completion of boot up of remote card 120).

In certain embodiments, multiplexer 112 includes one or more ports. The ports of multiplexer 112 are used to connect multiplexer 112 to interfaces 114 of controller card 110 and interfaces 124 of remote cards 120. Multiplexer 112 may include any suitable number of ports. In the illustrated embodiment of FIG. 1, multiplexer 112 includes at least three ports to connect to interfaces 124 of remote cards 120 and at least five ports to connect to interfaces 114 of controller card 110.

Interfaces 114 of system 100 are devices that connect two components of device 105 to each other. For example, interfaces 114 may facilitate communication between multiplexer 112 and CPU 116 of controller card 110. Interfaces 114 include interface 114a, interface 114b, interface 114c, interface 114d, and interface 114e. Interfaces 114 are transport interfaces that carry data. In certain embodiments, one or more interfaces 114 are serial terminal interfaces. Serial terminal interfaces are communication interfaces that transmit data as a single stream of bits. One or more interfaces 114 may be a universal asynchronous receiver-transmitter (UART). A UART is a computer hardware device for asynchronous serial communication in which the data format and transmission speeds are configurable. In certain embodiments, the UART is an integrated circuit (IC), or a portion thereof, used for serial communications. One or more UART peripherals may be integrated in microcontroller chips. In the illustrated embodiment of FIG. 1, interface 114a, interface 114b, interface 114c, interface 114d, and interface 114e each connect multiplexer 112 to CPU 116 of controller card 110.

CPU 116 of controller card 110 is the electronic circuitry that executes instructions that make up a computer program. CPU 116 performs basic arithmetic, logic, controlling, and/or I/O operations specified by the instructions. Each CPU 116 includes a processing unit and control unit. In certain embodiments, CPU 116 may run multiple processes (e.g., number crunching, vector processing, signal processing, video raster graphics, etc.). In some embodiments, CPU 116 is used to detect faults in one or more remote cards 120.

Remote cards 120 (i.e., remote card 120a, remote card 120b, and remote card 120c) of system 100 are hardware components that are interconnected but separately removable from device 105. In certain embodiments, remote cards 120 are configured to plug into a chassis of device 105. Remote cards 120 may include expansion cards, line cards, fabric cards, and the like. Expansion cards are circuit boards that can be inserted in device 105 to provide additional facilities and/or memory. Line cards are printed circuit boards that provide a transmitting/receiving port for a network (e.g., a local area network (LAN), a wide area network (WAN), etc.). Fabric cards are cards that facilitate the transfer of data through interconnecting switches. Remote cards 120 include interfaces 124 and CPUs 126.

Interfaces 124 of remote cards 120 are devices that connect two components of system 100 to each other. Interfaces 124 facilitate communication between multiplexer 112 of controller card 110 and CPUs 126 of remote cards 120. Interfaces 124 of remote cards 120 include interface 124a of remote card 120a, interface 124b of remote card 120b, and interface 124c of remote card 120c. In the illustrated embodiment of FIG. 1, interfaces 124 are transport interfaces that carry data. In certain embodiments, one or more interfaces 124 are serial terminal interfaces. Serial terminal interfaces are communication interfaces that transmit data as a single stream of bits. One or more interfaces 124 may be a UART. Interfaces 124 connect multiplexer 112 to CPUs 126 of remote cards 120. In the illustrated embodiment of FIG. 1, interface 124a connects multiplexer 112 to CPU 126a of remote card 120a, interface 124b connects multiplexer 112 to CPU 126b of remote card 120b, and interface 124c connects multiplexer 112 to CPU 126c of remote card 120c.

CPUs 126 of remote cards 120 are electronic circuitry that executes instructions that make up a computer program. CPUs 126 perform basic arithmetic, logic, controlling, and/or I/O operations specified by the instructions. Each CPU 126 includes a processing unit and control unit. In certain embodiments, CPUs 126 may run multiple processes (e.g., number crunching, vector processing, signal processing, video raster graphics, etc.). CPUs 126 of remote cards 120 include CPU 126a of remote card 120a, CPU 126b of remote card 120b, and CPU 126c of remote card 110c.

Each CPU 126 of remote cards 120 may serve different functions. For example, CPU 126a of remote card 120a may provide video-on-demand, CPU 126b of remote card 120b may provide Internet Protocol Television (IPTV), CPU 126c of remote card 120c may provide cloud-based computing, and so on. CPUs 126 of remote cards 110 communicate with multiplexer 112 of controller card 110 via interfaces 124.

In addition to the components shown in FIG. 1, system 100 may include any type of network that facilitates communication between components of system 100. One or more networks of system 100 may connect one or more components of system 100. This disclosure contemplates any suitable network. One or more portions of any network of system 100 may include an ad-hoc network, an intranet, an extranet, a virtual private network (VPN), a LAN, a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. One or more networks of system 100 may be a communications network, such as a private network, a public network, a connection through Internet, a mobile network, a WI-FI network, a cloud network, etc. One or more components of system 100 may communicate over one or more networks of system 100.

In operation, multiplexer 112 of controller card 110 is connected to CPU 116 of controller card 110 using interfaces 114 (i.e., interfaces 114a, 114b, 114c, 114d, and 114e). In certain embodiments, interfaces 114 are UARTs. Upon command, multiplexer 112 of controller card 110 connects to CPU 126a of remote card 120a using interface 124a. Multiplexer establishes connection 130a between CPU 116 of controller card 110 and CPU 126a of remote card 120a using interfaces 114a and 124a. Connection 130a creates an established session between CPU 116 of controller card 110 and CPU 126a of remote card 120a. CPU 116 of controller card 110 may use the established session created by connection 130a to monitor remote card 120a for faults. Upon another command, multiplexer 112 of controller card 110 connects to CPU 126c of remote card 120c using interface 124c. Multiplexer establishes connection 130b between CPU 116 of controller card 110 and CPU 126c of remote card 120c using interfaces 114c and 124c. Connection 130b creates a second established session between CPU 116 of controller card 110 and CPU 126c of remote card 120c. CPU 116 of controller card 110 may use the established session created by connection 130b to monitor remote card 120c for faults while simultaneously monitoring remote card 120a for faults. In certain embodiments, interface 124a and interface 124c are UARTs. Upon command, multiplexer 112 disconnects connection 130a and connection 130b, which terminates the sessions between CPU 116 of controller card and CPUs 126a and 126c of remote cards 120a and 120c, respectively. As such, system 100 provides CPU 116 of controller card 110 simultaneous access to one or more remote cards 120 independent of the software/firmware running in remote cards 120, which allows for independent management, fault detection, and the like in parallel.

Although FIG. 1 illustrates a particular arrangement of device 105, controller card 110, multiplexer 112, interfaces 114, CPU 116, remote cards 120, interfaces 124, and CPUs 126, this disclosure contemplates any suitable arrangement of device 105, controller card 110, multiplexer 112, interfaces 114, CPU 116, remote cards 120, interfaces 124, and CPUs 126. For example, certain embodiments may include a third connection (e.g., connection 130c) from interface 114b of controller card 110 to interface 124b of remote card 120b.

Although FIG. 1 illustrates a particular number of devices 105, controller cards 110, multiplexers 112, interfaces 114, CPUs 116, remote cards 120, interfaces 124, and CPUs 126, this disclosure contemplates any suitable number of devices 105, controller cards 110, multiplexers 112, interfaces 114, CPUs 116, remote cards 120, interfaces 124, and CPUs 126. For example, system 100 may include more or less than three remote cards 120 and/or three interfaces 124. As another example, system 100 may include more or less than five interfaces 114. As still another example, device 105 of system 100 may include more than one controller card 110.

FIG. 2 illustrates an example method 200 for establishing sessions between CPUs using a multiplexer. Method 200 begins at step 205. At step 210, a multiplexer (e.g., multiplexer 112 of FIG. 1) of a controller card (e.g., controller card 110 of FIG. 1) is connected to a CPU (e.g., CPU 116 of FIG. 1) of the controller card using first interfaces (e.g., interfaces 114 of FIG. 1, which include interfaces 114*a*, 114*b*, 114*c*, 114*d*, and 114*e*). In certain embodiments, the first interfaces are transport interfaces (e.g., UARTs). Method 200 then moves from step 210 to step 215.

At step 215 of method 200, the multiplexer of the controller card connects to CPUs (e.g., CPUs 126 of FIG. 1, which include CPUs 126*a*, 126*b*, and 126*c*) of remote cards (e.g., remote cards 120 of FIG. 1, which include remote cards 120*a*, 120*b*, and 120*c*) using second interfaces (e.g., interfaces 124 of FIG. 1, which include interfaces 124*a*, 124*b*, and 124*c*). In certain embodiments, the second interfaces are transport interfaces (e.g., UARTs). The controller card and the remote cards are part of a system (e.g., system 100 of FIG. 1), such as a modular router system. Method 200 then moves from step 215 to step 220.

At step 220 of method 200, the multiplexer of the controller card determines whether it has received a request to establish a session between the CPU of the controller card and one or more CPUs of the remote cards. For example, an operator of the device (e.g., device 105 of FIG. 1) associated the controller card may send a command to the multiplexer that instructs the multiplexer to establish one or more sessions between the CPU of the controller card and the one or more CPUs of the remote cards. If the multiplexer does not receive a request to establish a session between the CPU of the controller card and one or more CPUs of the remote cards, method 200 advances from step 220 to step 255, where method 200 ends.

If, at step 220, the multiplexer receives a request to establish a session between the CPU of the controller card and one or more CPUs of the remote cards, method 200 moves from step 220 to step 225, where the multiplexer establishes a session between the CPU of the controller card and one or more CPUs of the remote cards by establishing one or more connections (e.g., connections 130 of FIG. 1, which include connections 130*a* and 130*b*) between the first interfaces of the controller card and the second interfaces of the remote cards. For example, the multiplexer may establish a first connection between an interface (e.g., interface 114*a* of FIG. 1) of the controller card and an interface (e.g., interface 124*a* of FIG. 1) of a first remote card (e.g., remote card 120*a* of FIG. 1), which in turn establishes a first session between the CPU of the controller card and the CPU of the first remote card. As another example, the multiplexer may establish a second connection between an interface (e.g., interface 114*c* of FIG. 1) of the controller card and an interface (e.g., interface 124*c* of FIG. 1) of a second remote card (e.g., remote card 120*c* of FIG. 1), which in turn establishes a second session between the CPU of the controller card and the CPU of the second remote card. Method 200 then moves from step 225 to step 230.

At step 230 of method 200, the CPU of the controller card monitors the established sessions for faults in the system. For example, the CPU of the controller card may monitor the first session between the CPU of the controller card and the CPU of the first remote card for faults (e.g., errors, bugs, etc.) in the first remote card. As another example, the CPU of the controller card may monitor the second session between the CPU of the controller card and the CPU of the second remote card for faults (e.g., errors, bugs, etc.) in the second remote card. In some embodiments, the CPU of the controller card monitors the first and second sessions simultaneously. In certain embodiments, the CPU of the controller card monitors the sessions during boot up of the remote cards. Method 200 then moves from step 230 to step 235.

At step 235 of method 200, the CPU of the controller card determines whether faults have been detected in the system. If the CPU of the controller card determines that faults have been detected in the system, method 200 moves from step 235 to step 240, where the CPU corrects the faults. For example, the CPU may discover a bug in the software of the remote card during boot up and fix the bug. Method 200 then moves from step 240 to step 245. If, at step 235, the CPU of the controller card determines that no faults have been detected in the system, method 200 advances from step 235 to step 245.

At step 245 of method 200, the multiplexer of the controller card determines whether it has received a request to terminate one or more sessions between the CPU of the controller card and one or more CPUs of the remote cards. For example, an operator of the device associated with the controller card may send a command to the multiplexer that instructs the multiplexer to terminate one or more sessions between the CPU of the controller card and the one or more CPUs of the remote cards. If the multiplexer does not receive a request to terminate a session between the CPU of the controller card and one or more CPUs of the remote cards, method 200 advances from step 245 to step 255, where method 200 ends.

If, at step 245, the multiplexer receives a request to terminate a session between the CPU of the controller card and one or more CPUs of the remote cards, method 200 moves from step 245 to step 250, where the multiplexer terminates the session between the CPU of the controller card and one or more CPUs of the remote cards by disconnecting one or more connections between the interfaces of the controller card and the interfaces of the remote cards. For example, the multiplexer may terminate the first connection between the interface of the controller card and the interface of the first remote card, which in turn terminates the first session between the CPU of the controller card and the CPU of the first remote card. As another example, the multiplexer may terminate the second connection between the interface of the controller card and the interface of the second remote card, which in turn terminates the second session between the CPU of the controller card and the CPU of the second remote card. Method 200 then moves from step 250 to step 255, where method 200 ends.

Although this disclosure describes and illustrates an example method 200 for establishing sessions between CPUs using a multiplexer including the particular steps of the method of FIG. 2, this disclosure contemplates any suitable method 200 for example method for establishing sessions between CPUs using a multiplexer, including any suitable steps, which may include all, some, or none of the steps of the method of FIG. 2, where appropriate.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates particular components, devices, or systems carrying out particular steps of method 200 of FIG. 2, this disclosure contemplates any suitable combination of any suitable components, devices, or systems carrying out any suitable steps of method 200 of FIG. 2.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a Wi-Fi network, a Wi-MAX network, a cellular telephone network (such as, for example, a Global System for Mobile Communications (GSM) network, a 3G/Universal Mobile Telecommunications Service (UMTS) network, a LTE network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages. The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A controller card, comprising:
   one or more processors; and
   one or more computer-readable non-transitory storage media coupled to the one or more processors and comprising instructions that, when executed by the one or more processors, cause the controller card to perform operations comprising:
      connecting, via a first interface of the controller card, a multiplexer of the controller card to a central processing unit (CPU) of the controller card;
      connecting, via an interface of a first remote card, the multiplexer of the controller card to a CPU of the first remote card;
      interconnecting the first interface of the controller card and the interface of the first remote card to establish a first connection between the CPU of the controller card and the CPU of the first remote card;
      interconnecting a second interface of the controller card and an interface of a second remote card to establish a second connection between the CPU of the controller card and the CPU of the second remote card; and
      simultaneously monitoring, by the CPU of the controller card, the CPU of the first remote card and the CPU of the second remote card at the same time for faults while:
         the first connection between the CPU of the controller card and the CPU of the first remote card is established and prior to completing boot up of the CPU of the first remote card; and
         the second connection between the CPU of the controller card and the CPU of the second remote card is established and prior to completing boot up of the CPU of the second remote card.

2. The controller card of claim 1, the operations further comprising:
   connecting, via the second interface of the controller card, the multiplexer of the controller card to the CPU of the controller card; and
   connecting, via the interface of the second remote card, the multiplexer of the controller card to the CPU of the second remote card.

3. The controller card of claim 2, wherein the first interface of the controller card is interconnected with the interface of the first remote card while the second interface of the controller card is interconnected with the interface of the second remote card.

4. The controller card of claim 1, wherein the faults are bugs.

5. The multiplexer of claim 1, wherein the first interface of the controller card and the interface of the first remote card are universal asynchronous receiver-transmitters (UARTs).

6. The controller card of claim 1, the operations further comprising terminating the first connection between the CPU of the controller card and the CPU of the first remote card by disconnecting the first interface of the controller card and the interface of the first remote card.

7. The controller card of claim 1, wherein:
   the controller card is part of a router; and
   the multiplexer of the controller card is connected to the first remote card over a chassis backplane.

8. A method, comprising:
   connecting, via a first interface of a controller card, a multiplexer of the controller card to a central processing unit (CPU) of the controller card;
   connecting, via an interface of a first remote card, the multiplexer of the controller card to a CPU of the first remote card;
   interconnecting, by the multiplexer, the first interface of the controller card and the interface of the first remote card to establish a first connection between the CPU of the controller card and the CPU of the first remote card;
   interconnecting a second interface of the controller card and an interface of a second remote card to establish a second connection between the CPU of the controller card and the CPU of the second remote card; and
   simultaneously monitoring, by the CPU of the controller card, the CPU of the first remote card and the CPU of the second remote card at the same time for faults while:
      the first connection between the CPU of the controller card and the CPU of the first remote card is established and prior to completing boot up of the CPU of the first remote card; and
      the second connection between the CPU of the controller card and the CPU of the second remote card is established and prior to completing boot up of the CPU of the second remote card.

9. The method of claim 8, further comprising:
   connecting, via the second interface of the controller card, the multiplexer of the controller card to the CPU of the controller card; and
   connecting, via the interface of the second remote card, the multiplexer of the controller card to the CPU of the second remote card.

10. The method of claim 9, wherein the first interface of the controller card is interconnected to the interface of the first remote card while the second interface of the controller card is interconnected to the interface of the second remote card.

11. The method of claim 8, wherein the faults are bugs.

12. The method of claim 8, wherein the first interface of the controller card and the interface of the first remote card are universal asynchronous receiver-transmitters (UARTs).

13. The method of claim 8, further comprising terminating the first connection between the CPU of the controller card and the CPU of the first remote card by disconnecting the first interface of the controller card and the interface of the first remote card.

14. The method of claim 8, wherein:
the controller card is part of a router; and
the multiplexer of the controller card is connected to the first remote card over a chassis backplane.

15. One or more computer-readable non-transitory storage media embodying instructions that, when executed by a processor, cause the processor to perform operations comprising:
connecting, via a first interface of a controller card, a multiplexer of the controller card to a central processing unit (CPU) of the controller card;
connecting, via an interface of a first remote card, the multiplexer of the controller card to a CPU of the first remote card;
interconnecting the first interface of the controller card and the interface of the first remote card to establish a first connection between the CPU of the controller card and the CPU of the first remote card;
interconnecting a second interface of the controller card and an interface of a second remote card to establish a second connection between the CPU of the controller card and the CPU of the second remote card; and
simultaneously monitoring, by the CPU of the controller card, the CPU of the first remote card and the CPU of the second remote card at the same time for faults while:
the first connection between the CPU of the controller card and the CPU of the first remote card is established and prior to completing boot up of the CPU of the first remote card; and
the second connection between the CPU of the controller card and the CPU of the second remote card is established and prior to completing boot up of the CPU of the second remote card.

16. The one or more computer-readable non-transitory storage media of claim 15, the operations further comprising:
connecting, via the second interface of the controller card, the multiplexer of the controller card to the CPU of the controller card; and
connecting, via the interface of the second remote card, the multiplexer of the controller card to the CPU of the second remote card.

17. The one or more computer-readable non-transitory storage media of claim 16, wherein the first interface of the controller card is interconnected to the interface of the first remote card while the second interface of the controller card is interconnected to the interface of the second remote card.

18. The one or more computer-readable non-transitory storage media of claim 15, wherein the faults are bugs.

19. The one or more computer-readable non-transitory storage media of claim 15, wherein the first interface of the controller card and the interface of the first remote card are universal asynchronous receiver-transmitters (UARTs).

20. The one or more computer-readable non-transitory storage media of claim 15, the operations further comprising terminating the first connection between the CPU of the controller card and the CPU of the first remote card by disconnecting the first interface of the controller card and the interface of the first remote card.

* * * * *